P. F. APFEL.
ELECTRICAL HEATING DEVICE.
APPLICATION FILED OCT. 5, 1915.

1,178,777.

Patented Apr. 11, 1916.

WITNESSES:
OJohnson
Frank Warren

INVENTOR
Philip F. Apfel
BY
C.D. Haskins
ATTORNEY

UNITED STATES PATENT OFFICE.

PHILIP F. APFEL, OF SEATTLE, WASHINGTON.

ELECTRICAL HEATING DEVICE.

1,178,777. Specification of Letters Patent. Patented Apr. 11, 1916.

Application filed October 5, 1915. Serial No. 54,279.

*To all whom it may concern:*

Be it known that I, PHILIP F. APFEL, a citizen of the United States, residing at Seattle, in the county of King and State of Washington, have invented a certain new and useful Improvement in Electrical Heating Devices, of which the following is a specification.

My invention relates to improvements in electrical heating devices, and the object of my improvement is to provide an electrical device which has an externally screw-threaded cylindrical portion adjacent to one of its ends thereby to adapt it to be associated with a closed receptacle, as a closed tank or a boiler, to heat liquid contained therein by projecting its active portion into such receptacle through a screw-threaded hole provided in a wall thereof to effect such an engagement of the screw-thread of said heating device with the screw-thread of said hole as will releasably fasten said device in its operative position and make a tight joint between it and the wall of said hole.

A further object of my improvements is to provide an electric heating device whose heating element shall be submerged in oil contained within a closed receptacle and which shall embody effective means for preventing a leakage of said oil between the surfaces of the passageways through the wall of the receptacle and the surfaces for the conductors which extend through said wall to connect with the heating element.

I accomplish these objects by devices illustrated in the accompanying drawings wherein—

Figure 1:
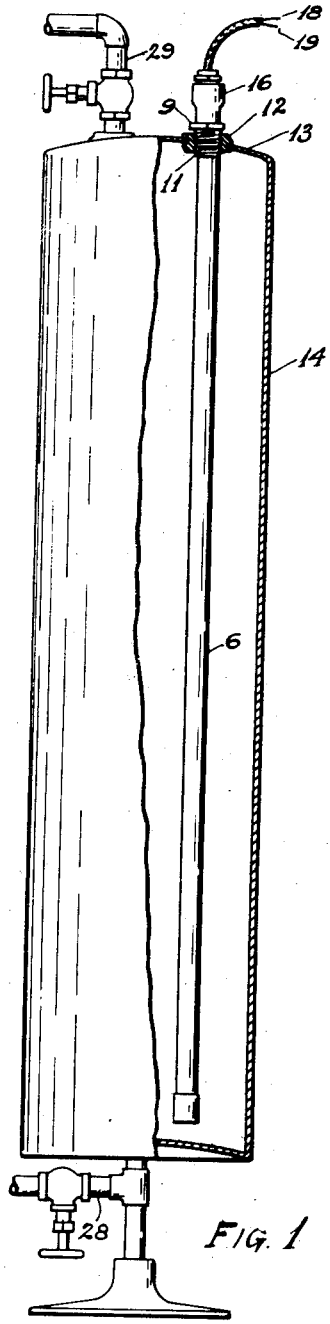
Figures 2, 3, 4, 5:
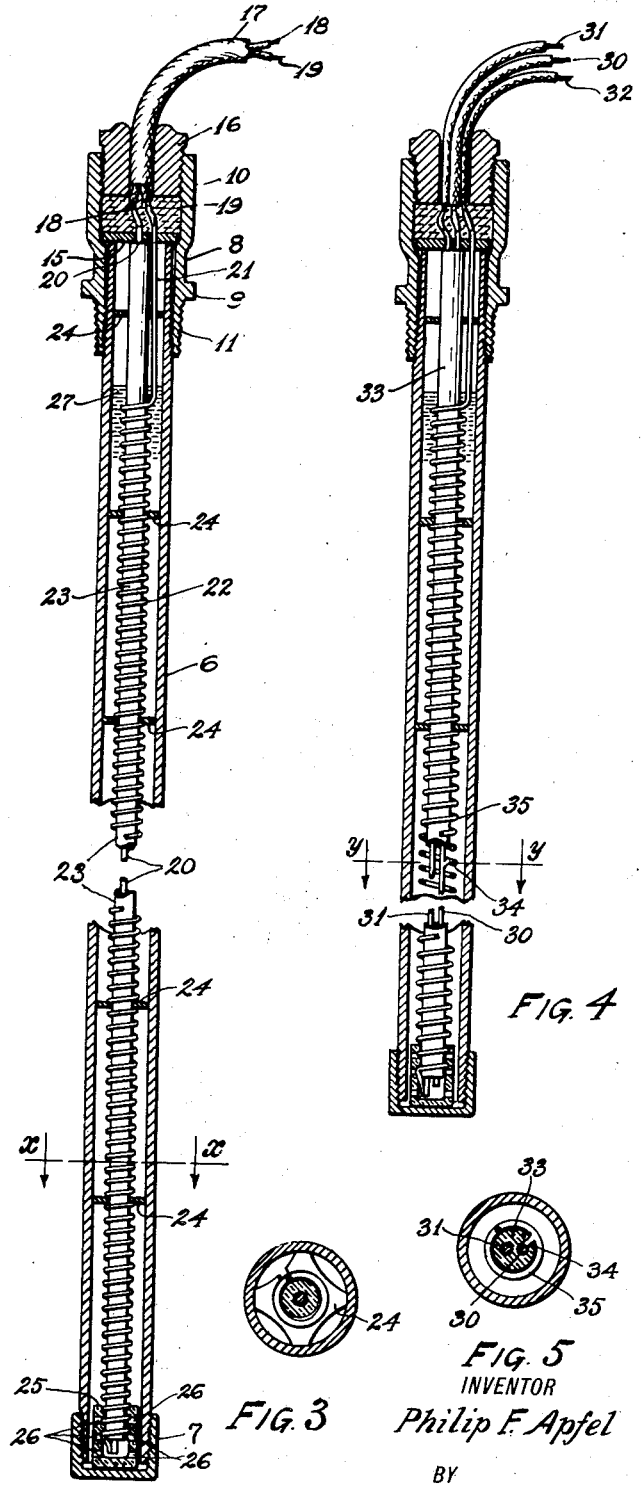

Figure 1 is a view in side elevation of a structure embodying my invention comprising a hot water tank and an electrical heating device, a section of which tank is removed better to show the manner of disposing said heating device; Fig. 2 is a view in longitudinal mid-section of my electrical heating device showing the arrangement of its internal parts; Fig. 3 is a view of the same in cross-section on broken line *x. x* of Fig. 2; Fig. 4 is a view showing a similar electrical heating device in longitudinal mid-section but wherein the heating element is modified with respect to the arrangement of its circuit connections; and Fig. 5 is a view of the same in cross-section on broken line *y. y* of Fig. 4.

Referring to the drawings, throughout which like reference numerals indicate like parts, a metal tube 6 is provided with a cap 7 screwed onto its lower end portion tightly to close such lower end, while the upper end portion of said tube 6 is slightly reduced in diameter for a short distance from its end surface and adjacent to such reduced portion is formed an externally screw-threaded portion upon which is screwed the internally screw-threaded end portion of a sleeve 8 which is provided with a hexagonal flange 9 and a portion 10 of larger diameter.

The internally screw-threaded end portion of said sleeve 8 is also provided with an external pipe-thread 11 to adapt it to be screwed into a bushing 12 fixed in the top wall 13 of a hot water tank 14 within which the metal tube 6 projects downwardly, as shown in Fig. 1, said hot water tank 14 being of a form commonly employed in association with a cooking range in a kitchen of a dwelling house.

The upper end portion of the sleeve 10 is provided with an internally screw-threaded portion adjacent to which is a portion of reduced internal diameter which extends to a point adjacent to the end surface of the tube 6, which end surface of said tube 6 serves as a shoulder for supporting a disk 15, preferably of insulating material that is impervious to hot oil, as vulcanized wood fiber coated with shellac.

Within the internally screw-threaded upper end portion of the sleeve 10 is screwed a bushing which serves to close the upper open end of said sleeve 10 and through said bushing 16 extends a close fitting flexible tube 17 of insulating material through which extends electrically insulated conducting wires 18 and 19 which connect respectively with ends 20 and 21 of an electric heating element 22 of helical form which is disposed to surround a tube-like core 23 of refractory insulating material, as asbestos, which is supported in a concentric position within the tube 6 to extend throughout the length thereof by means of members 24 of the form more clearly shown in Fig. 3, said heating element 22 extending from its end 20 through the disk 15 vertically downward through the tube 23 to its lower end to connect with the lower end of its helical portion which extends upwardly around said core 23 to and through the disk 15 to connect its upper end with the conducting wire as shown in Fig. 2.

The lower end of the helical portion of the heating element 22 is provided with an internally screw-threaded cap 25 whose screw-thread corresponds in pitch to the pitch of the convolutions of such helical portion whereby such cap 25 is adapted to screw on to the lower end of said helical portion while in engagement with the lower end portion of the core 23 to dispose it in the manner shown in Fig. 2; and such cap 25 is perforated with holes 26 through which oil may gain access to the interior portion of said cap 25, the tube 6 having a sufficient quantity of oil disposed within it to submerge the whole of the helical portion of the heating element 22 as indicated by the broken lines 27, while the air space above the said lines 27 serves to permit such oil to expand in response to heat generated by the heating element 22 when a required current of electricity flows through said heating element 22.

In order tightly to seal the space between the top surface of the disk 15 and the bottom surface of the bushing 16, through which space the conducting wires 18 and 19 extend, such space is filled with gum shellac which is disposed therein in a melted state to embed the portions of the conducting wires 18 and 19 contained therein before the bushing 16 is screwed into its position as shown in Fig. 2, thus oil contained in the tube 6 cannot leak out therefrom.

In utilizing the structure of Fig. 2 in association with a hot water tank, like the tank 14, which is commonly employed in the kitchen of dwelling houses, the tube 6 is inserted into such tank 14 downwardly through the bushing 12 to engage the screw-thread thereof with the screw-thread 11 of the sleeve 10, and thereupon a wrench is applied to the hexagonal flange 9 and then the structure is rotated to screw the sleeve 10 into said bushing 12 thereby securely to fasten the structure in its position as shown in Fig. 1.

The bushing 12 of the tank 14 is present in all hot water tanks similar to the tank 14 for the purpose of connecting a pipe leading to a cooking range or stove containing coils for heating water circulating therethrough, and the structure of Fig. 2 is especially adapted to serve as a substitute for such cooking range and its associated coils by thus disposing such structure in association with a tank, like tank 14, in the manner illustrated in Fig. 1, without making any alteration therein, and when so associated the operation of the devices so combined is as follows: Water is admitted into the tank 14 through a valve controlled pipe 28 at the bottom thereof, to fill it with water, which may then be conducted out of the top of the tank 14 through a valve-controlled pipe 29 which may be extended to different points of consumption, such water within the tank 14 being subjected to contact with the surface of the metal tube 6 which may be heated in response to the flow of a sufficient current of electricity through the conducting wires 18 and 19 (which are connected with a source of electricity not shown) and through the heating element 22 in an obvious manner, whereby such heating element 22 is heated to a desired high degree, and the heat thereof is imparted to the oil in which said heating element 22 is submerged, and the oil thus heated imparts its heat to the metal tube 6 which in its turn imparts such heat to the water within the tank 14.

In Figs. 4 and 5, I have illustrated a structure in all respects like the structure of Fig. 2, except that in the structure of Fig. 4 I have provided a conducting wire 30 in addition to conducting wires 31 and 32 which correspond respectively to conducting wires 18 and 19 of Fig. 2, said additional conducting wire 30 being extended into the tube 6 and through the core 33 (which corresponds to the core 23 of Fig. 2) for a distance where it may be connected to the middle point 34 of the heating element 35 (which corresponds to the heating element 22 of Fig. 2) whereby with the aid of suitable switches, not shown, associated with said conducting wires 30, 31 and 32 and with the source of electricity, a current of electricity may, in a well known manner, be caused to traverse only in a desired one of the two halves of the heating element 35, or to traverse both of said halves as in series with each other, and also to be caused to traverse both of said halves as in multiple with each other at different desired times.

Manifestly, changes may be made in the forms, dimensions and arrangement of parts of my invention without departing from the spirit thereof.

What I claim is:

1. An electrical heating device of the class described, which embodies a container made of a metal tube closed at one of its ends by a suitable end wall; a metal sleeve mounted securely on the other end portion of said container to project one of its ends beyond the annular end surface of said container, said one end having an internal screw-thread, while its other end portion is provided with an external screw-thread; a perforated disk of insulating material disposed within said sleeve to engage with the annular end surface of said container; a bushing screwed into the outer end of said sleeve; electrical conductors disposed to extend from the interior of said container outwardly through said disk and said bushing to the exterior of said container; oil-proof insulating material disposed to fill the space between said disk and said bushing and around said conductors; an electrical heating element comprising a length of bare wire of helical form disposed within said container and connected with said electrical conductors; means for preventing electrical contact between said heating element and the wall of said container; and a body of electrically non-conducting fluid disposed within said container to submerge said heating element.

2. An electrical water heating device of the class described, which embodies a metal tube provided with a cap disposed to close one of its ends and further provided with a sleeve mounted on its other end portion, said sleeve extending a portion of its length beyond the end surface of said tube and said extended portion being provided with an internal screw-thread; a body of oil disposed within said tube; an electrical heating element comprising a length of metal wire placed within said tube in a position to be submerged in said body of oil; insulated electric conductors connected with the terminals of said heating element and disposed to extend therefrom through said sleeve to the exterior of said tube; a perforated disk of insulating material disposed within said sleeve to cover the end surface of said tube to close tightly the annular space between said electric conductors and the inner surface of the end portion of said tube; a body of gum shellac disposed within said sleeve to adhere to the outer side of said disk and to said wires thereby hermetically to close the entrance to said tube, and a bushing provided with an external screw-thread and disposed to screw into the screw-threaded end of said sleeve to surround said insulated electric conductors and to engage with said body of gum shellac.

3. An electric water heating device of the class described, which embodies a metal tube closed at one of its ends by an end wall, while its other end portion is provided with a sleeve that extends a portion of its length beyond the end surface of said tube; an electric heating element disposed within said tube; a body of electrically non-conducting fluid disposed within said tube to surround said heating element; electric conductors connected each with a different point on said heating element and disposed to extend therefrom through said sleeve to the exterior thereof; a perforated disk of insulating material disposed within said sleeve to cover the end surface of said tube tightly to close the annular space between said conductors and the inner surface of the end portion of said tube; a body of gum shellac disposed within said sleeve to adhere to the outer side of said disk and to said wires thereby hermetically to close the entrance to said tube; and a bushing disposed to close the end of said sleeve to surround said conductors and to engage with said gum shellac.

In witness whereof, I, hereunto subscribe my name this 29th day of September, A. D., 1915.

PHILIP F. APFEL.

Witnesses:
 FRANK WARREN,
 A. HASKINS.